US008037417B2

(12) United States Patent
Jarrett et al.

(10) Patent No.: US 8,037,417 B2
(45) **Date of Patent: *Oct. 11, 2011**

(54) LASSO SELECT

(75) Inventors: Robert J. Jarrett, Snohomish, WA (US); Gerhard A. Schobbe, Seattle, WA (US); Marieke Iwema, Seattle, WA (US); Charlton E. Lui, Redmond, WA (US); F. David Jones, Redmond, WA (US); Emily K. Rimas, Seattle, WA (US); Bodin Dresevic, Bellevue, WA (US); Subha Bhattacharyay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 11/115,595

(22) Filed: Apr. 26, 2005

(65) Prior Publication Data

US 2005/0198591 A1 Sep. 8, 2005

Related U.S. Application Data

(62) Division of application No. 10/146,705, filed on May 14, 2002, now Pat. No. 7,299,424.

(51) Int. Cl.
*G06F 3/033* (2006.01)

(52) U.S. Cl. .......................................................... 715/763

(58) Field of Classification Search .................. 715/863, 715/859, 860, 822, 823; 382/186–189
See application file for complete search history.

(56) References Cited

U.S. PATENT DOCUMENTS 5,455,901 A * 10/1995 Friend et al. .................. 715/209
5,471,578 A * 11/1995 Moran et al. .................. 715/863
5,479,596 A * 12/1995 Capps et al. .................. 715/234
5,485,565 A 1/1996 Saund et al.
5,523,775 A * 6/1996 Capps .......................... 345/179
5,528,743 A * 6/1996 Tou et al. ...................... 715/234
5,583,542 A * 12/1996 Capps et al. .................. 345/173
5,592,608 A 1/1997 Weber et al.

(Continued)

FOREIGN PATENT DOCUMENTS

EP 0566294 A2 10/1993
EP 0566294 B1 10/1993

OTHER PUBLICATIONS

Final Office Action mailed Nov. 17, 2009 for U.S. Appl. No. 11/115,592, filed Apr. 26, 2005.

(Continued)

*Primary Examiner* — Ba Huynh
(74) *Attorney, Agent, or Firm* — Shook Hardy & Bacon, LLP

(57) ABSTRACT

A lasso select tool that allows a user to draw a flexible line of selection ink in order to select one or more graphical objects for manipulation. As the user draws this selection line, the lasso select tool continuously redraws and displays a connection line connecting one end of the selection line with the opposite end of the selection line. This connection line thus graphically demonstrates to the user the area that is presently encompassed by the resulting lasso enclosure. Further, the lasso select tool will change the appearance of any object selected with the lasso enclosure. The lasso select tool also selects objects that are only substantially encompassed by the lasso enclosure. For example, the lasso select tool may select ink objects that are only 60% or more encompassed by the lasso enclosure.

8 Claims, 9 Drawing Sheets

Note1 - Microsoft Notebook
File Edit View Tools Web 207a
209
201
201a
This is some selectable
207
information.
201b
205
203
207b
1/1

U.S. PATENT DOCUMENTS

| | | | | |
|---|---|---|---|---|
| 5,594,810 | A | 1/1997 | Gourdol | |
| 5,602,570 | A * | 2/1997 | Capps et al. | 345/173 |
| 5,652,806 | A * | 7/1997 | Friend | 382/175 |
| 5,655,136 | A | 8/1997 | Morgan | |
| 5,694,532 | A * | 12/1997 | Carey et al. | 345/419 |
| 6,021,218 | A * | 2/2000 | Capps et al. | 382/187 |
| 6,687,876 | B1 | 2/2004 | Schilit et al. | |
| 7,299,424 | B2 | 11/2007 | Jarrett et al. | |
| 2002/0141643 | A1 * | 10/2002 | Jaeger | 382/181 |
| 2003/0179214 | A1 | 9/2003 | Saund et al. | |
| 2003/0179235 | A1 | 9/2003 | Saund et al. | |
| 2004/0054701 | A1 | 3/2004 | Garst | |

OTHER PUBLICATIONS

European Search Report dated Feb. 11, 2010, 3 pages.

Non Final Office Action mailed Apr. 3, 2008, U.S. Appl. No. 11/115,592, Titled “Lasso Select” Jarett, Robert J.

Office Action, U.S. Appl. No. 11/115,592, mailed Mar. 25, 2009, 11 pages.

Office Action, U.S. Appl. No. 11/115,592, mailed Oct. 16, 2008, 10 pages.

Office Action mailed Apr. 6, 2010 in U.S. Appl. No. 11/115,592.

Notice of Allowance in U.S. Appl. No. 11/115,592 mailed Oct. 28, 2010.

* cited by examiner

LASSO SELECT

RELATED APPLICATIONS

This application is a divisional of U.S. patent application Ser. No. 10/146,705, filed on May 14, 2002, entitled "Lasso Select," and naming Robert J. Jarrett et al. as inventors, which application is incorporated entirely herein by reference.

FIELD OF THE INVENTION

The present invention relates to apparatus and methods that allow a user to conveniently select a plurality of objects, even if the objects are not arranged in a straight line or have irregular shapes. More particularly, the invention relates to a self-closing lasso selection tool that can be flexibly drawn by a user to encircle one or more desired graphical objects.

BACKGROUND OF THE INVENTION

The use of graphical user interfaces has created a revolution in the field of computers. Instead of having to memorize arcane commands, the user can now manipulate software applications simply by controlling graphical objects representing their various functions and components. For example, instead of requiring a user to delete a file with a delete command, some operating systems, such as the Microsoft Windows® operating system, allow a user to delete a file by dragging a graphical object representing the file to a graphical object representing a trash can.

The capability of these graphical user interfaces to manipulate software through graphical objects has even been expanded to allow a user to input data through handwriting. For example, with some software applications, a user may employ a stylus to write on a digitizer, and the data points measured by the digitizer are then collected and rendered as lines on a display. Because the lines rendered from these data points resemble actual ink written with a pen, the data points are often referred to as electronic ink, and the characters, words and drawings formed with this electronic ink are often referred to as electronic ink objects. Some software applications even recognize when the shapes of these lines of electronic ink objects correspond to characters, and convert the recognized shapes into text data. This recognition ability conveniently allows the user to input text data into the computer using the natural, familiar, process of handwriting.

One problem that has arisen with the use of such graphical objects, however, relates to the individual selection of such graphical objects within a graphical user interface. Because these software applications may conveniently allow a user to place a graphical object at a variety of locations in the two-dimensional space of a user interface, it is sometimes difficult for a user to subsequently select one or more of these graphical objects of its for manipulation. For example, a user may write one word spaced between two very closely adjacent words. If the user subsequently decides to move or delete only the middle word, the user may have difficulty selecting that middle word for manipulation without inadvertently selecting one of the adjacent words. Further, a user may write words at an odd angle, or desire to select words broken up across multiple lines. A user may thus have difficulty in selecting the desired words without selecting other words or graphical objects inadvertently.

Various tools have been developed to assist a user in selecting specific graphical objects for manipulation. For example, some software applications allow a user to form a "rubber band" rectangle around one or more adjacent graphical objects. With this rubber band rectangle tool, a user activates the selection function, places a cursor at a first location, and then drags the cursor to a second location. As the cursor is being dragged, the tool forms a rectangular selection box with the first location of the cursor and the current location of the cursor as opposite vertices of the selection box. By continuing to drag the cursor, a user can change the dimensions of the selection box to encompass one or more graphical objects. When the user releases the selection function, the graphical objects completely encompassed by the selection box are selected for subsequent manipulation.

While this type of selection tool provides some ability for a user to select individual graphical objects, this tool has several drawbacks. First, the tool only forms a single rectangular selection area. In many cases, a user may wish to select multiple graphical objects that cannot be bounded by a single rectangular selection box without that box also encompassing graphical objects that the user does not wish to select. This is a particularly significant drawback when the graphical objects are handwritten words, and a user may often want to simultaneously select words at one end of a line of writing and words at the opposite end of the next line of writing. Second, in order to select a graphical object, the selection box must completely encompass that object. If a user is working quickly, the user may inadvertently form a selection box that does not entirely encompass a desired graphical object. When the user then releases the selection function, the desired object will not be selected. Some alternate embodiments of this tool require the selection box to encompass only a designated center of a graphical object, but the user may still encircle a large portion of a desired object without actually selecting that object. Thus, the use of this tool requires an inconvenient amount of precision from the user. Further, when using a stylus to form the selection box, the user is unable to add or subtract parts of the selection.

Another tool that has been developed to help a user select graphical objects is the lasso select tool. With this tool, the user activates the selection function, and then draws a free-form line of selection ink about any object the user wishes to select. When the user releases the selection function, the tool calculates a straight connection line between the two ends of the selection line to form a "lasso" enclosure around the enclosed objects. Only the objects (or portions therefore) that are entirely enclosed within the lasso enclosure are then selected for manipulation. The conventional lasso select tool also has its disadvantages, however. First, the conventional lasso select tool selects only a portion of an object encompassed by the lasso enclosure. Thus, if the user does not fully encircle an object, the portions of the object outside of the lasso enclosure will not be selected and manipulated with the portion of the object within the lasso. This is particular problem for selecting ink objects, because letters will often have irregular shapes, may have ascenders (such as "h," "b," and "d") or descenders (such as "j," "g," and "q") that a user will inadvertently miss with a lasso enclosure.

Second, the tool does not change the appearance of selected objects until after the selection process has been completed. The user thus cannot judge with certainty how much of an object has been selected when forming the lasso, and must wait until the lasso is complete (that is, until it is too late to change the shape of the lasso) before being able to ascertain what objects are selected with the lasso. As with the previously described selection tools, the conventional lasso select tool therefore also requires an inconvenient amount of precision from the user.

Accordingly, there is a need for a selection tool that will allow a user to conveniently select one or more graphical objects in their entirety, without requiring an inconvenient amount of precision from the user. Further, there is a need for a selection tool that clearly indicates to the user when one or more objects actually are selected during the selection process, while the lasso is still being drawn.

SUMMARY OF THE INVENTION

Advantageously, the invention provides a lasso select tool that allows a user to flexibly select a plurality of graphical objects that are not arranged in a straight line. Moreover, the lasso select tool of the invention allows the user to select a graphical object simply by enclosing a substantial portion of the object with the lasso enclosure. It does not require the lasso enclosure to encompass the entire object or even a center of the object. For example, the lasso select tool of the invention may allow a user to select an entire object simply by encircling 60% or more of that object with the lasso enclosure. Still further, the invention provides a lasso select tool that continuously displays the area enclosed by the selection lasso, so that the user can clearly identify objects that will be selected through the lasso. To further assist the user in identifying objects selected by the tool, the lasso select tool of the invention changes the appearance of objects that have been selected by the current form of the lasso enclosure.

BRIEF DESCRIPTION OF THE DRAWINGS

The foregoing summary of the invention, as well as the following detailed description of preferred embodiments, will be better understood when read in conjunction with the accompanying drawings.

DETAILED DESCRIPTION OF PREFERRED EMBODIMENTS

Overview

As will be discussed in detail below, the lasso select tool of the present invention allows a user to draw a flexible line of selection ink in order to select one or more graphical objects for manipulation. As the user draws this selection line, the lasso select tool continuously redraws a connection line connecting one end of the selection line with the opposite end of the selection line. This connection line thus graphically demonstrates to the user the area that is presently encompassed by the resulting lasso enclosure. Further, the lasso select tool will change the appearance of any object selected with the lasso enclosure. For example, the lasso select tool may give a selected ink object a hollow appearance. By creating a connection line between two ends of the lasso's selection line, and by changing the appearance of objects substantially encircled by the lasso, the lasso select tool provides a user a direct feedback as to which objects have been selected by the lasso enclosure before the selection process is completed.

In addition, the lasso select tool according to the invention selects an object when the lasso enclosure encircles just a substantial portion of the object. For example, the lasso tool may select an ink object when the lasso enclosure encircles 60% or more of its ink. By selecting objects that are only substantially encompassed by the lasso enclosure, the lasso select tool of the invention allows a user to select desired objects without requiring a great deal of precision. This feature is also very beneficial when the user wants to select a graphical object that has a small overlap with another graphical object, such as when a letter in one ink word object overlaps a letter in another ink word object. The user can form the lasso enclosure around most of the desired ink word object to select that object, without having to enclose the part of that object which overlaps the other ink word object.

Exemplary Operating Environment

The lasso select tool of the invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 1:
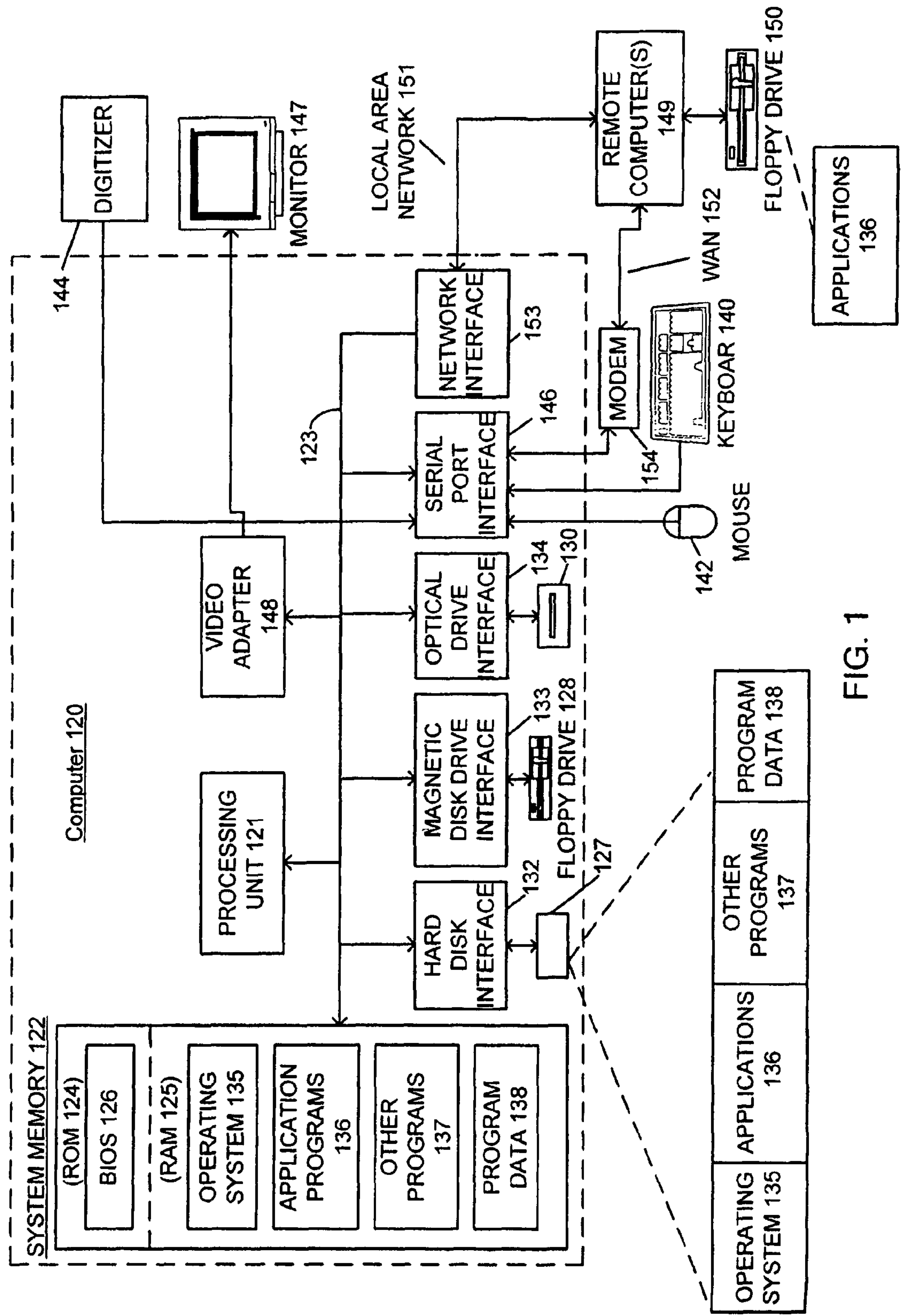
FIG. 1 shows a schematic diagram of a general-purpose digital computing environment that can be used to implement various aspects of the invention.

As noted above, the invention relates to the selection of graphical objects displayed by a computer. Accordingly, it may be helpful for a better understanding of the invention to briefly discuss the components and operation of a typical programmable computer on which various embodiments of the invention may be implemented. Such an exemplary computer system is illustrated in FIG. 1. The system includes a general-purpose computing device 120. This computing device 120 may take the form of a conventional personal digital assistant, a tablet, desktop or laptop personal computer, network server or the like.

Computing device 120 typically includes at least some form of computer readable media. Computer readable media can be any available media that can be accessed by the computing device 120. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computing device 120 will typically include a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes computer storage media devices, such as a read-only memory (ROM) 124 and random access memory (RAM) 125. A basic input/output system 126 (BIOS), containing the basic routines that help to transfer information between elements within the personal computer 120, such as during startup, is stored in ROM 124.

The personal computer or network server 120 may further include additional computer storage media devices, such as a hard disk drive 127 for reading from and writing to a hard disk (not shown), a magnetic disk drive 128 for reading from or writing to a removable magnetic disk (not shown), and an optical disk drive 130 for reading from or writing to a removable optical disk (not shown) such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the computing device 120.

Although the exemplary environment described herein employs a hard disk drive 127, a removable magnetic disk drive 128 and a removable optical disk drive 130, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Also, it should be appreciated that more portable embodiments of the computing device 120, such as a tablet personal computer or personal digital assistant, may omit one or more of the computer storage media devices discussed above.

A number of program modules may be stored on the hard disk drive 127, magnetic disk drive 128, optical disk drive 130, ROM 124 or RAM 125, including an operating system 135 (e.g., the Windows CE, Windows® 2000, Windows NT®, or Windows 95/98 operating system), one or more application programs 136 (e.g. Word, Access, Pocket Outlook, etc.), other program modules 137 and program data 138. A user may then enter commands and information into the computing device 120 through input devices such as a keyboard 140 and pointing device 142.

As previously noted, some embodiments of the invention are directed a lasso select tool that is particularly useful for selecting objects written in electronic ink, such as handwritten words, drawing lines, sketches and other irregular ink strokes. Accordingly, the computing device 120 may also include one or more additional input devices, other than keyboard 140, through which electronic ink may be written. These other input devices may include, for example, a digitizer 144, through which a user can input data by writing the input data onto the digitizer 144 with a stylus. As will be appreciated by those of ordinary skill in the art, the digitizer 144 may be an individual standalone device. Alternately, as with a personal digital assistant or a tablet personal computer, it may be integrated into a display for the computing device 120. Still other input devices may include, e.g., a microphone, a joystick, game pad, satellite dish, scanner, touch pad, touch screen, or the like.

These and other input devices are often connected to the processing unit 121 through a serial port interface 146 that is coupled to the system bus 123, but may be connected by other interfaces, such as a parallel port, game port, universal serial bus (USB), or a 1394 high-speed serial port. A monitor 147 or other type of display device is also connected to the system bus 123 via an interface, such as a video adapter 148. As discussed above, the monitor 147 may be integrated with the digitizer 144 to form a digitizing display. In addition to the monitor 147, the computing device 120 may typically include other peripheral output devices (not shown), such as speakers and printers.

The computing device 120 may operate in a networked environment using logical connections to one or more remote computers, such as a remote computing device 149. The remote computing device 149 may be another personal digital assistant, personal computer or network server, a router, a network PC, a peer device or other common network node, and typically includes many or all of the elements described above relative to the computing device 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the computing device 120 is connected to the local area network 151 through a network interface or adapter 153. As will be appreciated by those of ordinary skill in the art, the network interface or adapter 153 may provide a connection to the LAN 151 through a wire or other tangible medium, or it may be a wireless network interface or adapter. When used in a WAN networking environment, the computing device 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the computing device 120, or portions thereof, may be stored in the remote memory storage device 150. It will be appreciated that the network connections shown are exemplary and other means of establishing a communications link between the computers may be used.

Use of the Lasso Select Tool

Figure 2A:
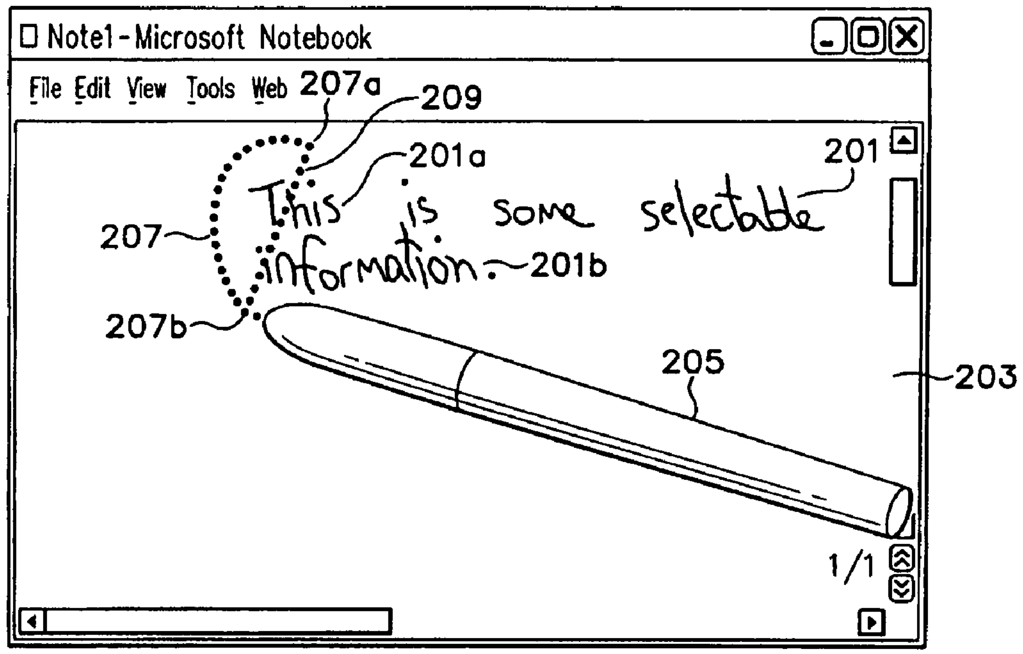
FIGS. 2A-C illustrate the formation of a lasso enclosure according to an embodiment of the invention.
Figure 2B:
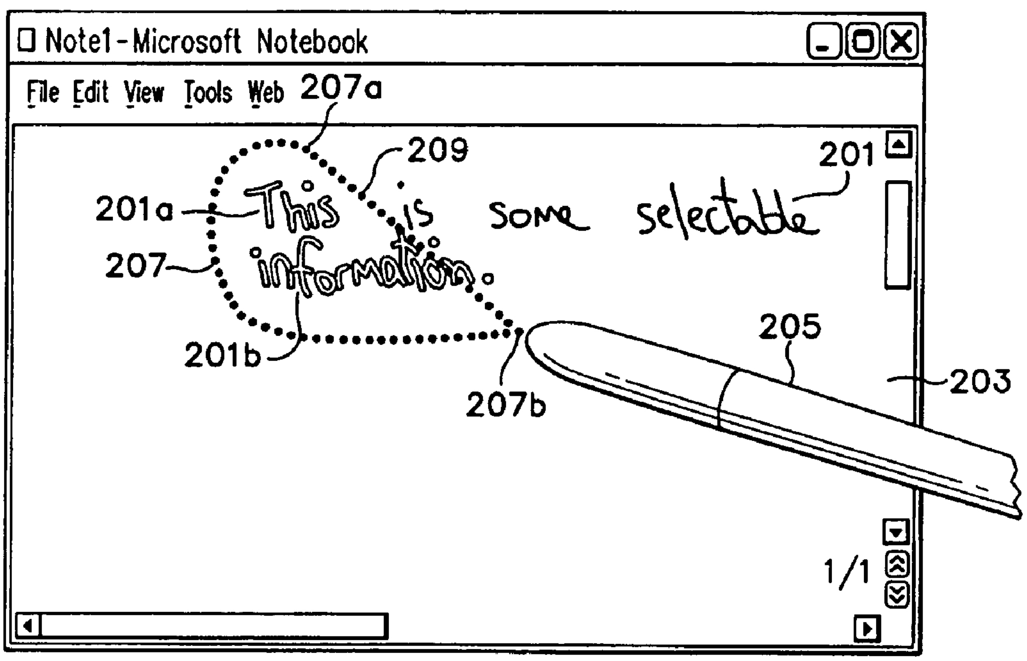
Figure 2C:
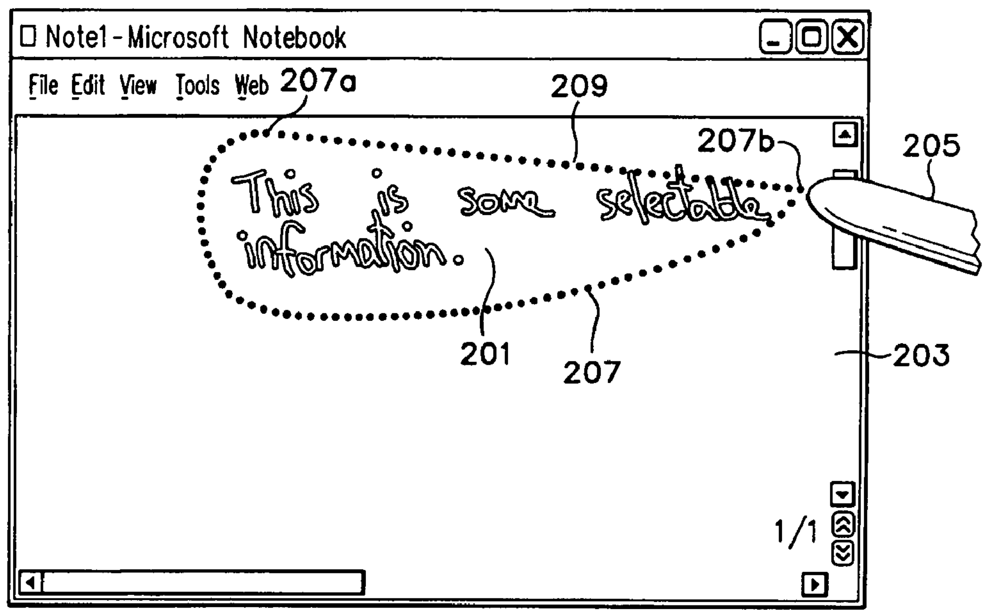

FIGS. 2A-2C illustrate one use of the lasso select tool of the invention. More particularly, these figures illustrate the use of the lasso select tool to select two lines of text 201 in the two-dimensional space of a user interface rendered on a digitizing display 203. The text 201 is made up of ink word graphical objects, such as the word object 201*a* ("This"), the word object 201*b* ("information") and the word object 201*c* ("is'). To begin, the user first activates the lasso select tool. For example, the lasso select tool may be active by default, or a user may choose the lasso select tool from a menu of one or more available tools, make a predefined gesture with the stylus 205 against the digitizing display 203, issue a voice command, or employ any other technique designated for initiating the operation of the lasso select tool. The user then contacts a stylus 205 to a desired location on the digitizing display 203. Contacting the stylus 205 with the digitizing display 203 creates the starting point 207*a* of a selection line 207. To draw the selection line 207, the user continues to hold the stylus 205 against the digitizing display 203 while dragging the point of the stylus 205 across the display 203. In this manner, the user begins to form a lasso enclosure around both the upper word object 201_a_ ("This") of the text 201 and the lower word object 201_b_ ("information") of the text 201.

It will be appreciated by those of ordinary skill in the art that it may be difficult for a user to draw a smooth selection line 207 by pressing the stylus 205 against the digitizing display 203. Instead, a user's hand will typically shake or lurch back and forth by small amounts while drawing the selection line 207. Accordingly, the process that conveys the input from the digitizer 203 to the lasso select tool may discard some data points produced by the stylus 205 that are very close together. This will smoothen the selection line 207 and prevent small loops from inadvertently being formed in the selection line 207 by the random shaking or lurching of the user's hand while writing with the stylus 207. Of course, if a user employs another type of pointing device, such as a mouse, touchpad, or pointing stick to form the selection line 207, this technique may also be used to smoothen the selection line 207. Also, those of ordinary skill in the art will appreciate that other techniques may be employed to smooth inadvertent jitters and loopbacks from the selection line 207.

As soon as the selection line 207 starts to lengthen, the lasso select tool draws a connection line 209 between the starting point 207_a_ of the selection line 207 and the current end point 207_b_ of the selection line 207 (that is, the point where the stylus 205 is currently contacting the digitizer display 203_b_). As new endpoints are drawn in the selection line 207, the tool continuously deletes and redraws the connection line 209 to connect the most recent endpoint with the starting point. Thus, the continuous redrawing of the connection line 209 forms a self-closing lasso enclosure with the selection line 207. At the instant shown in FIG. 2A, the lasso enclosure formed by the selection line 207 and the current connection line 209 does not substantially enclose any word object in the text 201. Thus, none of the text 201 is selected by the lasso enclosure in this figure.

Turning now to FIG. 2B, it can be seen that, as the selection line 207 continues to be drawn, the connection line 209 continues to be redrawn to connect the starting point 207_a_ of the selection line 207 with the current end point 207_b_ of the selection line 207 (that is, where the stylus 205 is currently contacting the digitizing display 203). This allows the user to view the entire perimeter of the lasso enclosure formed by the selection line 207 and the connection line 209, and thus to more easily identify the graphical objects encompassed by the lasso enclosure. As shown in this figure, the selection line 207 has been drawn to expand the lasso enclosure to encompass a substantial amount of both the word objects 201_a_ ("this") and 201_b_ ("information") of the text 201. By encompassing a substantial amount of these word objects, the lasso enclosure selects these objects for manipulation.

In the illustrated embodiment, the connection line 209 has the same appearance as the selection line 207. It should be noted, however, that with alternate embodiments of the invention, the connection line 209 may appear differently than the selection line 207. The connection line 209 may, for example, be formed of a different line type, such as a lighter weight line type, or even have a different color. By visibly distinguishing the connection line 209 from the selection 207, a user can readily identify the selection line 207 that the user has drawn and can modify from the connection line 209 automatically formed by the lasso select tool.

With various embodiments of the lasso select tool of the invention, the tool may change the appearance of an object in the two-dimensional space rendered by the digitizing display when that object is selected. For example, as shown in FIG. 2B, the electronic ink in both of the word objects 201_a_ ("this") and 201_b_ ("information") is displayed with a hollow appearance when those objects have been selected. This change of appearance conveniently helps the user determine whether an object has been selected before the user has finalized the shape of the lasso enclosure, thereby allowing the user to modify the enclosure to ensure that a desired object is selected. One technique for providing objects with a hollow appearance is described in a copending U.S. patent application Ser. No. 10/144,256, filed on May 14, 2002, entitled "Method And Apparatus For Hollow Selection Feedback," naming Marieke Iwema et al. as inventors, which application is incorporated entirely herein by reference. Of course, while the illustrated embodiment of the invention gives selected ink objects a hollow appearance, those of ordinary skill in the art will appreciate that any other suitable technique may be used to indicate when an object has been selected, including bolding, coloring, highlighting, and underlining.

As previously noted, the lasso select tool of the invention selects an ink object when the lasso enclosure substantially encompasses the object. In the illustrated embodiment, for example, the tool selects a word when the lasso enclosure encompasses 60% or more of the object. The tool will thus select the word object 201_a_ ("This") when the lasso enclosure encompasses 60% or more of this ink object. This conveniently allows the user to select an ink objects without requiring that the user exercise high level of precision necessary to enclose the entire ink object or a designated center of ink the object. Of course, those of ordinary skill in the art will appreciate that this percentage may vary between embodiments of the lasso select tool, depending upon the amount of precision desired from the user. For example, some embodiments of the invention may select an ink object only after the lasso enclosure has encompassed 80% or more of that graphical object. With still other embodiments, the tool may select an ink object when only 40% (or even less, if desired) of the object is encompassed by the lasso enclosure.

A lasso select tool according to the invention may also require that different amounts of an object be encompassed for selection depending upon the type of the graphical object. For example, with the illustrated embodiment, the tool selects a graphical object formed of electronic ink when the lasso enclosure encompasses 60% or more of the ink in that object. The same lasso select tool may require, however, that a lasso enclosure encompass 80% or more of an image object, such as a GIF image, before selecting that image. Thus, the amount of an object that must be contained within the lasso enclosure before the object is selected can be variable. This feature permits the lasso select tool to require additional precision for the selection of some types of graphical objects and less precision for the selection of other types of graphical objects.

Turning now to FIG. 2C, it can be seen that, as the user has continued to draw the selection line 207, the tool has also continued to redraw the connection line 209 to connect the starting point 207_a_ of the selection line 207 with the most recent end point 207_b_. In this figure, the lasso enclosure formed by the selection line 207 and the connection line 209 encompasses a substantial amount of each word object in the text 201. Correspondingly, the appearance of the electronic ink in each word object of the text 201 is changed to appear hollow, thereby indicating that the current shape of the lasso enclosure has selected each word object of the text 201. Of course, other techniques may be employed to indicate when an object will be substantially encompassed by the lasso enclosure. The user may now simply lift the stylus 205 from the digitizing display 203 to complete the selection process. With some embodiments of the invention, the lasso enclosure will disappear, but the selected text will continue to be displayed in a special manner (for example, with a hollow effect)

to indicate its selection. Of course, still other embodiments of the invention may maintain the appearance of the lasso enclosure.

Figure 3A:
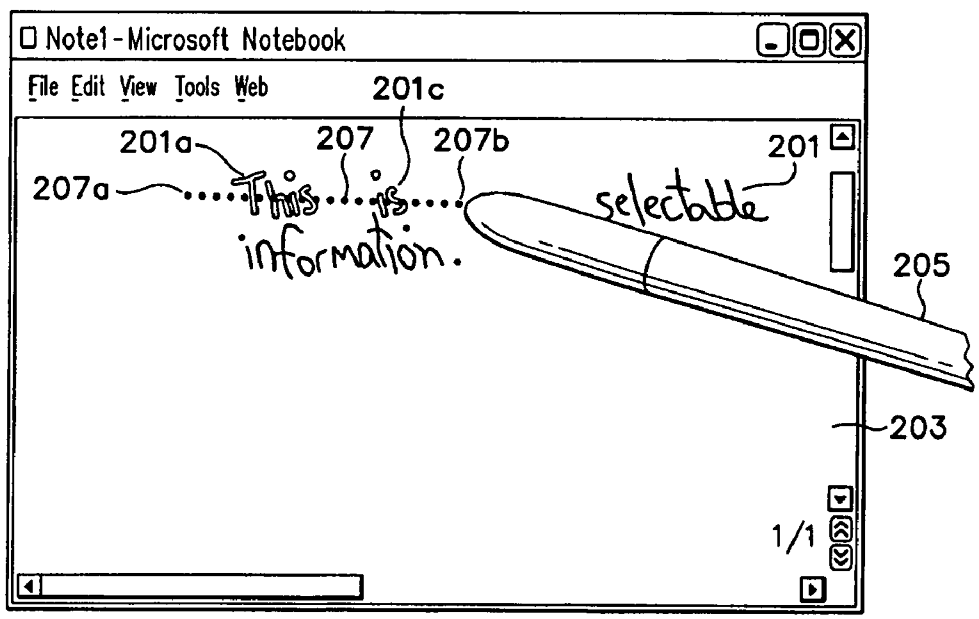
FIGS. 3A and 3B illustrate the formation of another lasso enclosure according to an embodiment of the invention.
Figure 3B:
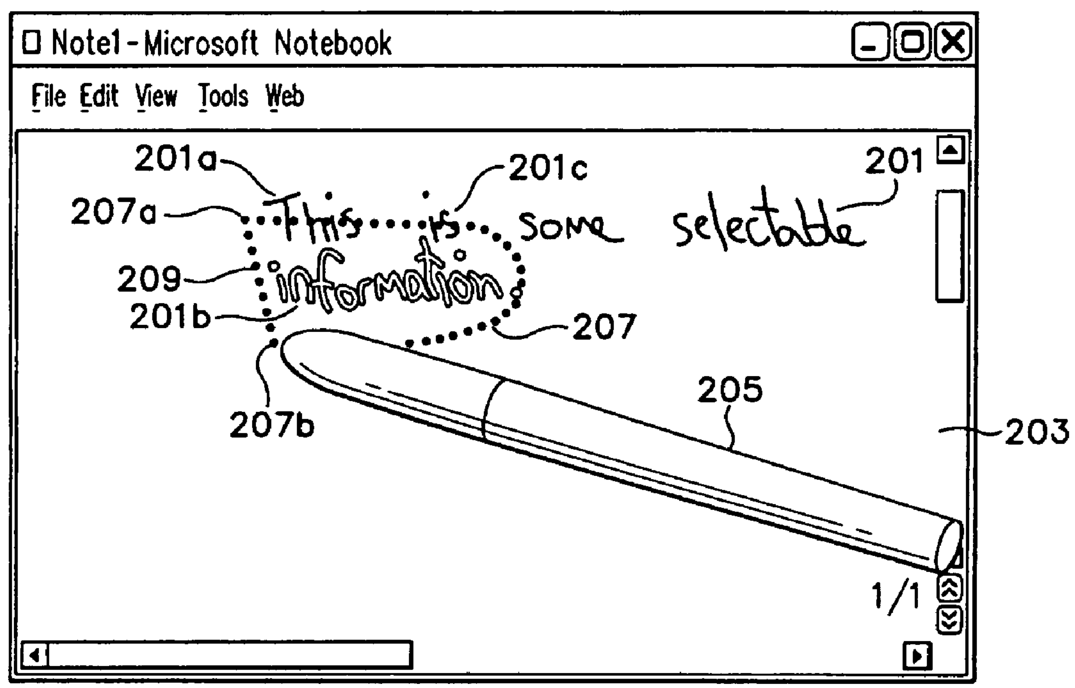

FIGS. 3A and 3B show yet another use of the lasso select tool according to the invention. As seen in FIG. 3A, the selection line 207 is approximately straight. With this embodiment of the lasso select tool, selection lines 207 that are approximately straight are not treated as part of a lasso enclosure. Instead, the tool considers straight selection lines 207 to be encounter selection lines. With an encounter selection line, the tool selects each object encountered (that is, intersected) by the selection line 207 in the two-dimensional space rendered by the digitizing display 203. For example, in FIG. 3A the tool has selected the word objects 201*a* ("This") and 201*c* ("is") through which the selection line 207 passes. The selection line 207 does not intersect the word object 201*b* ("information"), so the word object 201*b* is not selected.

In FIG. 3B, however, the user has continued to draw the selection line 207 so that it no longer is approximately straight. Instead, the selection line 207 has curved around the word object 201*b* ("information"). When the selection line 207 begins to be drawn so that it is no longer straight, the lasso select tool of the invention stops treating the selection line 207 as an encounter selection line. Instead, the tool creates the connection line 209 between the starting point of the selection line 207 and the current end point of the selection line 207, so that the selection line 207 and the connection line 209 together form a lasso enclosure. As seen in FIG. 3B, because the selection line 207 has become non-linear, the word objects 201*a* ("This") and 201*c* ("information") are deselected. The selection line 207 continues to intersect these word objects, but they are not substantially encompassed by the lasso enclosure formed by the selection line 207 and the connection line 209.

Rather, as seen in this figure, the tool selects the word object 201*b* ("information") because it is substantially encompassed by the lasso enclosure. It should be noted that, while the selection line 207 still intersects the word objects 201*a* ("This") and 201*c* ("information"), it does not intersect the selected word object 201*b* ("information"). As will be appreciated from this example, a user may thus conveniently use the lasso select tool of the invention to select a word object written in electronic ink without having to avoid intersecting surrounding word objects with the selection line 207.

Of course, while the selection 207 shown in FIGS. 2A-3B have been shown as being drawn with a stylus 205 on digitizing display 203, those of ordinary skill in the art will appreciate that other techniques can be used to employ the lasso select tool of the invention. For example, another pointing device, such as a mouse, touchpad, or pointing stick, can be used to draw the selection line 207 in the two-dimensional space containing the desired graphical objects to be selected. Further, with the use of alternate pointing devices, a non-digitizing display may be used to render the two-dimensional space containing the selection line and the graphical objects to be selected.

The Lasso Select Tool

Figure 4:
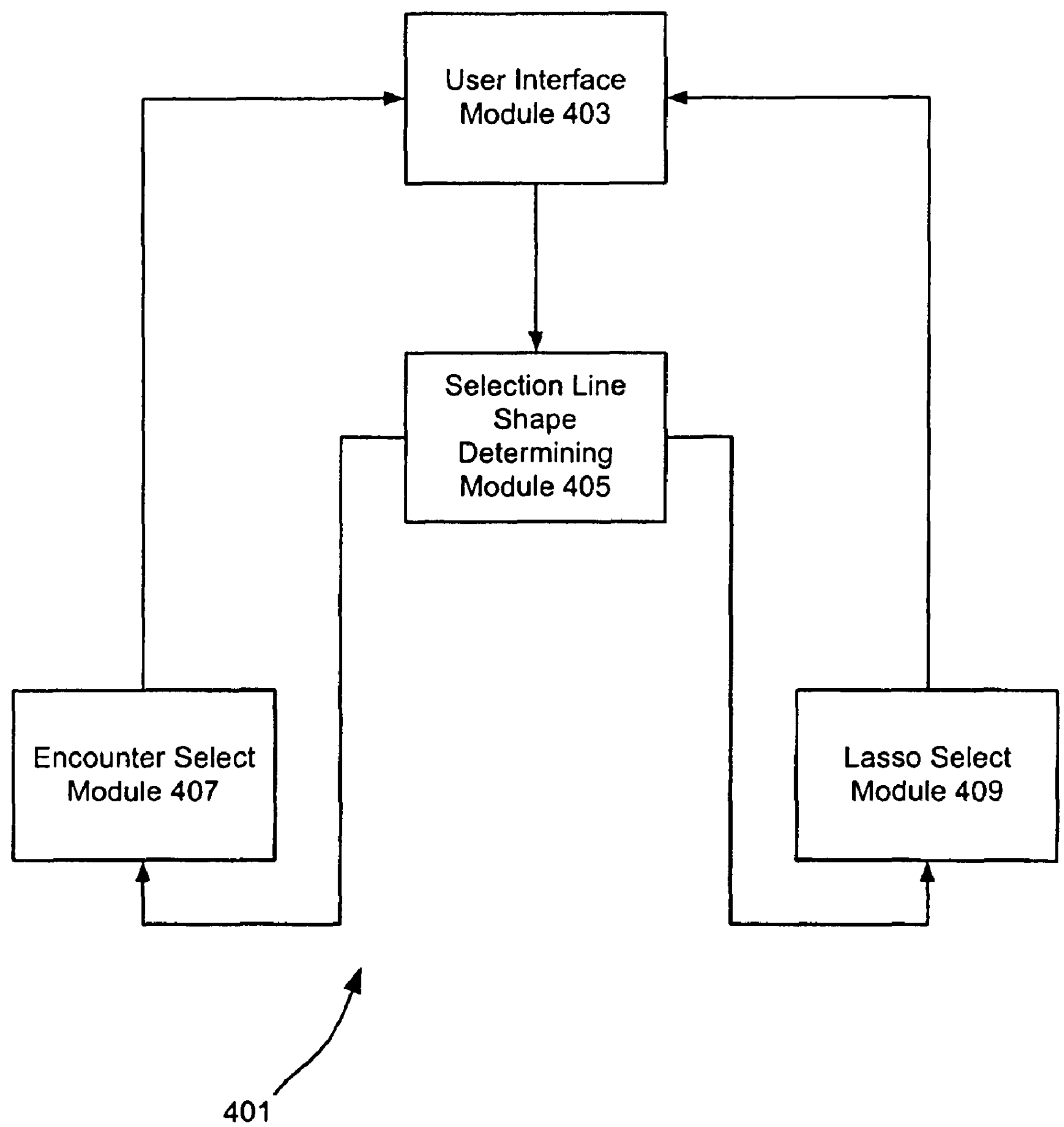
FIG. 4 shows a schematic diagram of a lasso select tool according to one embodiment of the invention.
Figure 5A:
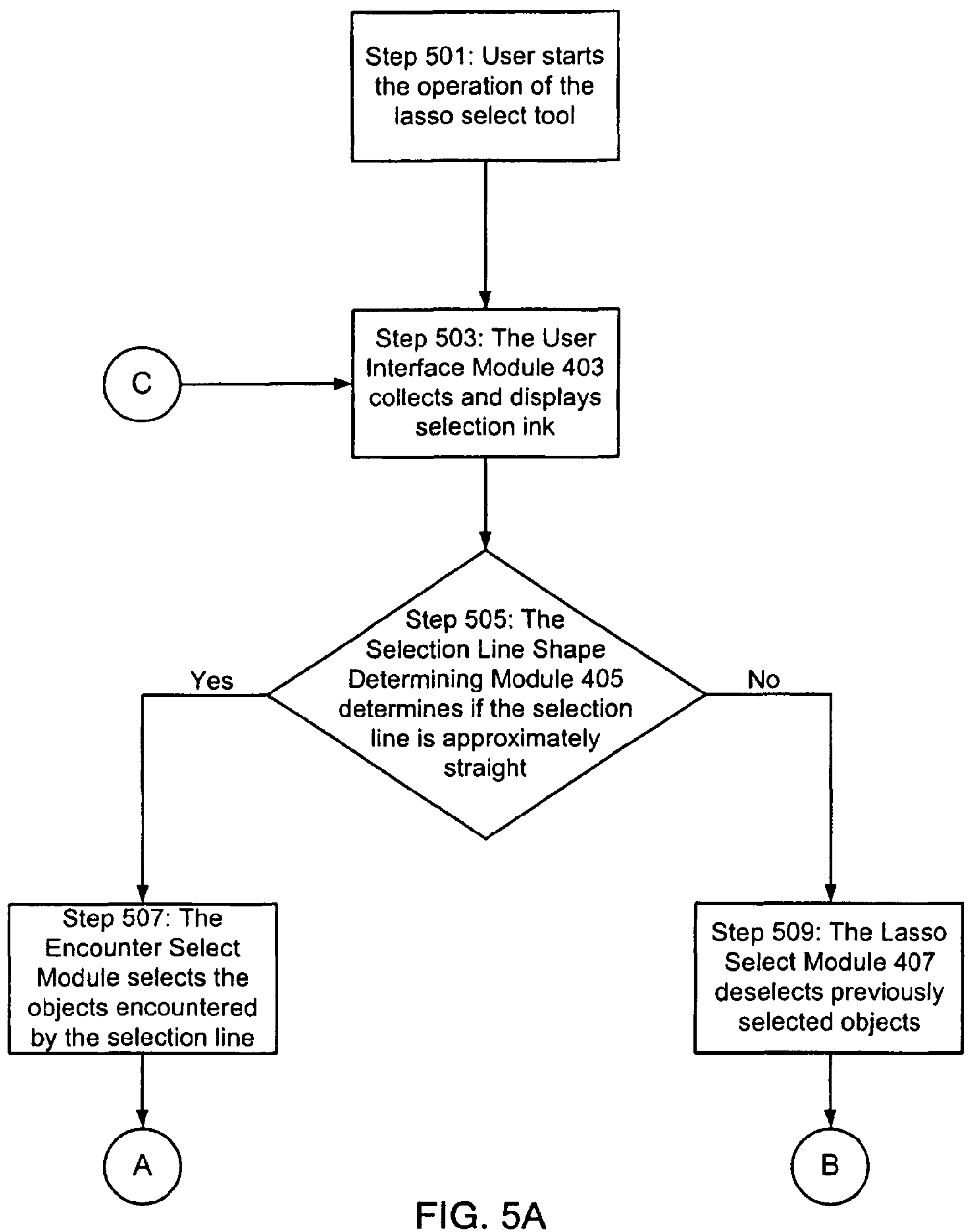
FIGS. 5A-5C and 6 illustrate flowcharts describing the operation of the lasso select tool shown in FIG. 4.
Figure 5B:
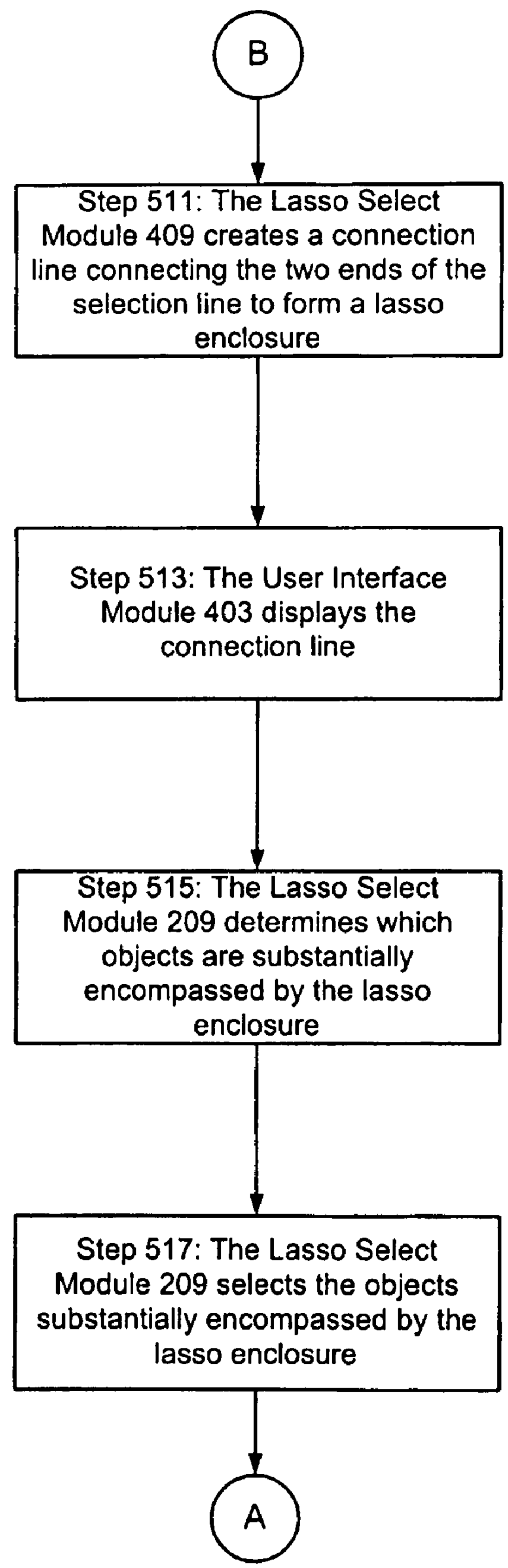
Figure 5C:
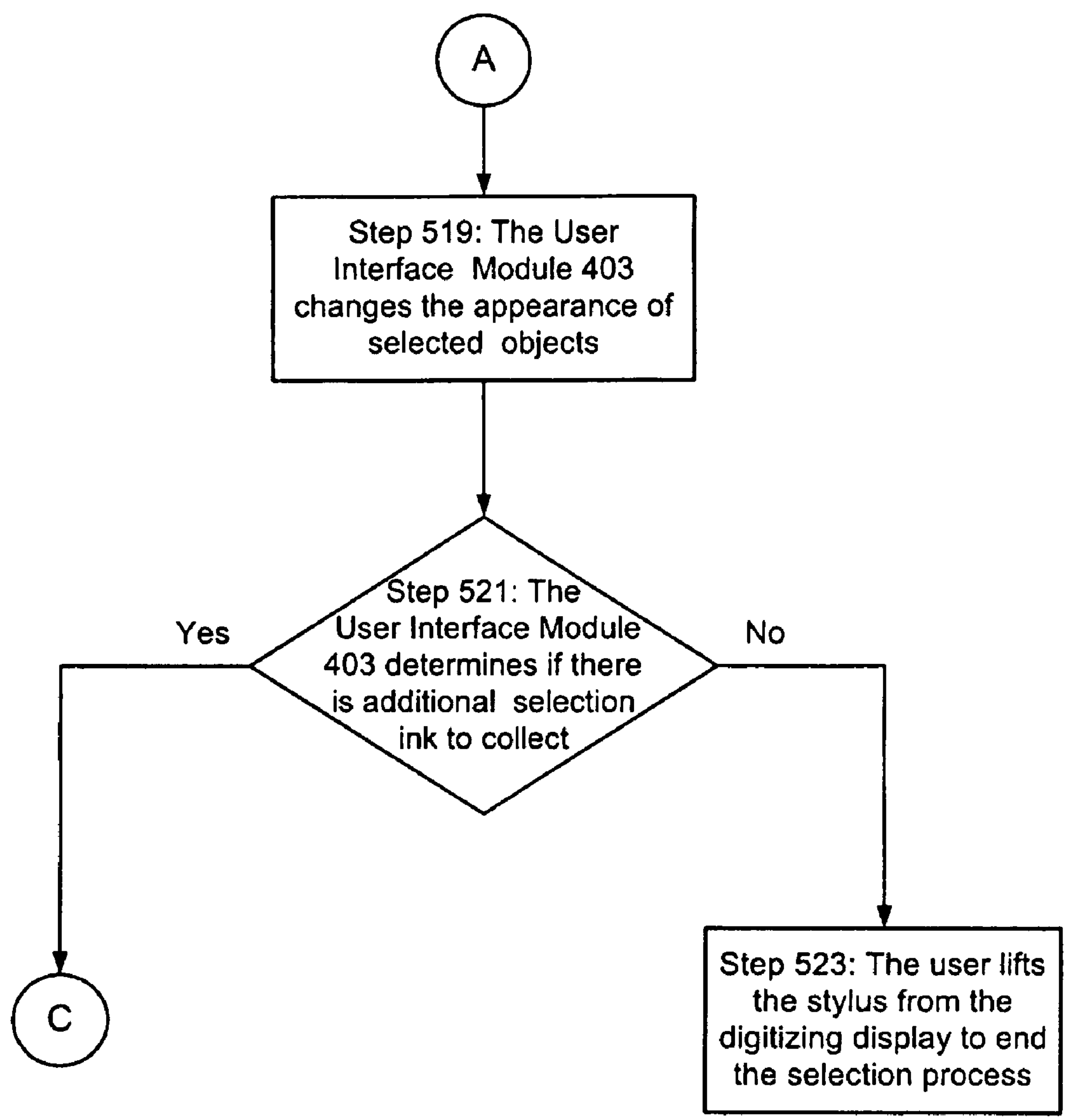

FIG. 4 illustrates the components of a lasso select tool 401 according to one embodiment of the invention. The lasso select tool 401 includes a user interface module 403, a selection line shape determining module 405, an encounter select module 407, and a lasso select module 409. The function of each of these components will be described with reference to FIGS. 5A-5C and FIG. 6, which illustrate flowcharts showing the operation of the lasso select tool 401. As seen in FIG. 5A, the user starts the operation of the lasso select tool 401 in step 501. The user may, for example, select the lasso select tool from a list of various tools and functions.

As will be appreciated by those of ordinary skill in the art, the user interface module 403 provides a user interface in a two-dimensional space rendered by a display. This two-dimensional space contains the graphical objects that can be selected by the lasso select tool 401, and may be, for example, a workspace containing the user interface of another software application, such as Microsoft Word or Notepad. The user interface module 403 allows a user to both write selection ink and view the results of the selection process in the two-dimensional space. Accordingly, in step 503, the user interface module 403 collects selection ink drawn by a user to form the selection line 207. Based upon the collected selection ink, the user interface module 403 displays the selection line 207 drawn with the selection ink in the two-dimensional space. In addition, the user interface module 403 provides the collected selection ink to the selection line shape determining module 405.

The selection line shape determining module 405 receives the selection ink collected by the user interface module 403, and, in step 505, determines the shape of the selection line formed by the selection ink. If the selection ink has been drawn in an approximately straight line, then the selection line shape determining module 405 passes the collected selection ink onto the encounter select module 407, which treats the selection line as an encounter selection line. On the other hand, if the selection ink does not form an approximately straight line, then the collected selection ink is passed to the lasso select module 409, which treats the selection ink as part of a lasso enclosure.

As will be appreciated by those of ordinary skill in the art, the degree to which a selection line must be non-linear before the selection line shape determining module 405 passes the collected selection ink onto the lasso select module 409 may vary. In some instances, it may be desirable to have a lasso tool that favors selection with a lasso enclosure. This tool may therefore require that the selection line be very straight before treating the selection as an encounter selection line. Alternately, it may be desirable to have a lasso selection tool that favors selection with an encounter selection line. This tool will then require the user to significantly curve or notch the selection line before passing the selection ink onto the lasso select module 409.

If the encounter select module 407 receives the selection ink, it treats the resulting selection line as an encounter selection line as previously noted. The encounter select module 407 thus determines each object in the two-dimensional space through which the selection line passes, and selects these objects for manipulation in step 507. The encounter select module 407 then identifies the selected objects to the user interface module 403, so that the user interface module 403 may change the appearance of the selected objects in step 519.

On the other hand, if the selection line shape determining module 405 passes the selection ink to the lasso select module 409, then the lasso select module 409 treats the selection line as part of a lasso enclosure. That is, if the selection line shape determining module 405 determines that the selection line is not straight, it concludes that the user is attempting to form a lasso enclosure to select graphical objects rather than an encounter select line. In step 509, the lasso select module 409 first deselects all of the objects that the lasso select tool 401 has previously selected. Any objects that were selected by the encounter select module 503 when the selection line was approximately straight are thus deselected when the selection line begins to be drawn non-linear (for example, drawn with a curve or notch). In this step, all of the objects in the two-dimensional space that were previously selected by the lasso select module 409 are deselected as well. Accordingly, if the user continues to draw the selection line so that the lasso enclosure it forms no longer substantially encompasses an object, that object will not remain selected. This feature allows a user to continue to draw a selection line so that it curves back on itself to select a desired object and deselect an object that was previously selected.

Next, in step 511, the lasso select line 409 creates a connection line between the two ends of the selection line, to thereby form a lasso enclosure. As will be appreciated by those of ordinary skill in the art, the lasso selection module 409 can simply plot a set of data points forming a straight line between the first selection ink point and the most recently created selection ink point. The lasso selection module 409 then provides the data points forming the connection line to the user interface module 503 so that, in step 513, the user interface module 503 can display the connection line to the user in the two-dimensional space.

Figure 6:
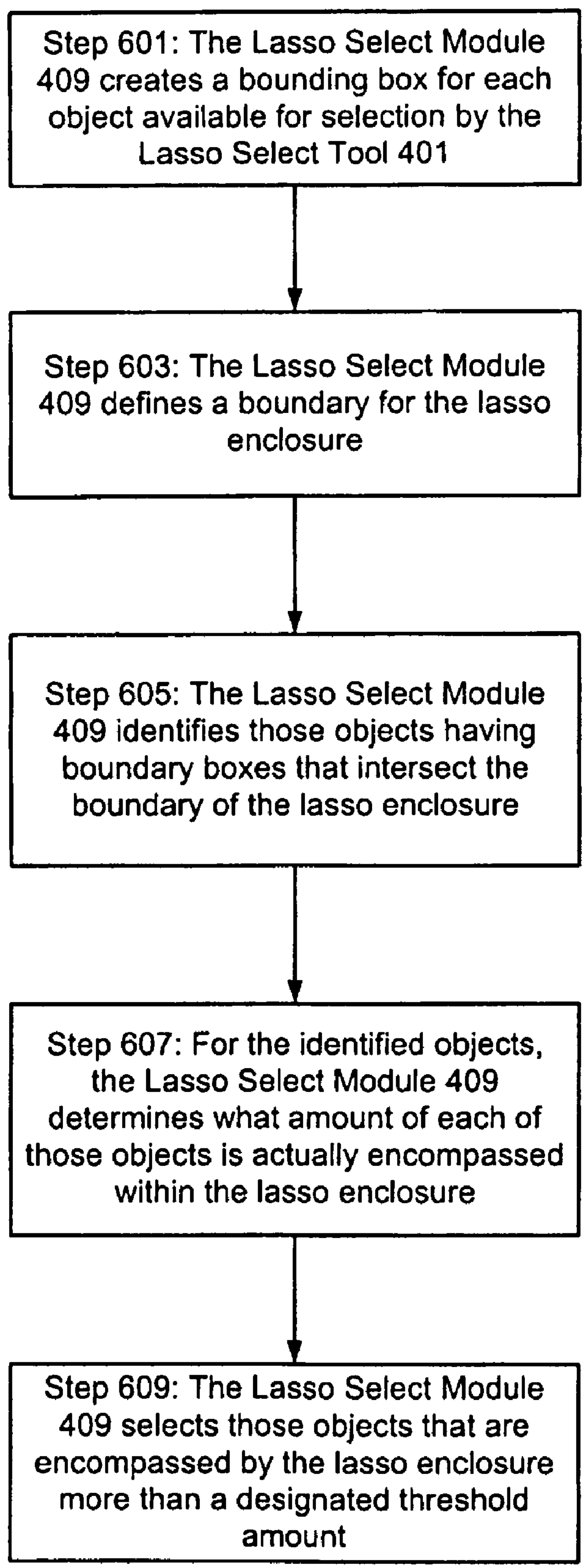

After the connection line is formed, in step 515 the lasso select module 409 determines which graphical objects rendered in the two-dimensional space are substantially encompassed by the lasso enclosure. This process is illustrated in FIG. 6. First, in step 601, the lasso select module 409 creates a bounding box for each object in the two-dimensional space that is available for selection by the tool. For example, if the lasso select tool 401 is being used to manipulate objects in a rendered Microsoft Word document, then the lasso select module creates a bounding box for each selectable graphical object in that document. As is well known to those of ordinary skill in the art, a bounding box is a rectangular boundary around a graphical object where each side of the box is offset from the graphical object by a predetermined distance.

Next, in step 603, the lasso select module 409 defines a boundary for the lasso enclosure. With some embodiments of the invention, the defined boundary of the lasso enclosure will be a bounding box created for the lasso enclosure. For alternate embodiments of the invention, however, the boundary of the lasso enclosure may be defined as the perimeter of the lasso enclosure itself. In step 605, the lasso select module 409 identifies those objects having boundary boxes that intersect the defined boundary of the lasso enclosure. Then, for the identified objects, the lasso select module 409 determines what amount of each of those objects is actually encompassed within the lasso enclosure in step 607. Then, in step 609, the lasso select module 409 selects those objects that are encompassed by the lasso enclosure more than a designated threshold amount.

As will be appreciated by those of ordinary skill in the art, steps 601-605 are optional, and may be omitted. That is, the lasso select module 409 can analyze every object available for selection by the lasso select tool 401, to determine how much of each available object is encompassed by the lasso enclosure. This process may be very time consuming for a large number of graphical objects, however. By forming boundary boxes around each available object and a boundary for the lasso enclosure, the lasso select module 409 can more quickly eliminate objects that cannot have any portion encompassed within the lasso enclosure.

More particularly, the bounding box for each object provides a maximum x-coordinate value and a maximum y-coordinate value for the location of that object in the two-dimensional space, as well as a minimum x-coordinate and a minimum y coordinate. Similarly, the boundary for the lasso enclosure provides a range of x-coordinates and a range of y-coordinates for the location of the lasso enclosure in the two-dimensional space. Overlap of these ranges can quickly be determined. If the x-coordinate value range for an object does not overlap with the x-coordinate value range for the lasso enclosure, and the y-coordinate value range for an object does not overlap with the y-coordinate value range for the lasso enclosure, the lasso select module 409 can efficiently eliminate any further consideration of that object.

As previously noted, different types of graphical objects may require different thresholds of encompassment by the lasso enclosure before being selected by the lasso select tool 401. Similarly, the amount of an object encompassed by the lasso enclosure may be determined differently for different types of graphical objects. With ink objects, the lasso select tool 401 may determine the amount of the object encompassed by the lasso enclosure using a number of different techniques.

For example, the lasso select tool 401 may determine the amount of an ink object encompassed by the lasso enclosure based upon the number of ink data points falling within the lasso enclosure. For example, an ink object may be a handwritten letter "H," with the first vertical ink stroke consisting of 6 ink data points, the second vertical ink stroke consisting of 7 ink data points, and the joining horizontal ink stroke consisting of 3 ink data points. Thus, this ink object would have a total of 16 data points. As will be appreciated by those of ordinary skill in the art, there are a variety of algorithms for determining if a data point or series of data points fall within a polygon like that formed by the lasso enclosure. If more than 60% of the data points (that is, if 10 or more data points) of the letter fall within the lasso enclosure, then the entire letter will be selected by the lasso select module 409.

As previously noted that ink objects can be a collection of one or more individual ink strokes formed by ink data points. The ink strokes can be manually grouped into an ink object by a user, or automatically grouped by a recognition engine, such as a handwriting recognition engine. Also, while the ink data points have locations within the two-dimensional space, they typically are not the same as the pixels displayed in the two-dimensional space to represent an ink line. Instead, the data points correspond to the location of a pointing device obtained at a periodic sampling rate. Thus, if a user begins writing an ink line very quickly at the beginning of the line, and slows down at the end of the ink line, the end of the ink line will consist of more data points than the beginning of the ink line. The density of ink data points within an ink object therefore may not be an accurate reflection of the total size of the object.

Accordingly, it may alternately be desirable to select an ink object based upon the overall size of the object. That is, it may be desirable to normalize the distance between ink data points to determine a size of each stroke in an ink object. For example, with a handwritten letter "H," the first vertical stroke may have a length of 12 units, the second vertical stroke may have a length of 14 vertical units, and the joining horizontal stroke may have a length of 7 units, for a total of 34 units. If the lasso enclosure encompasses a more than 60% of the total length of strokes in the letter (that is, 21 or more units of strokes), then the entire letter is selected.

The overall size of an ink object can be determined, for example, based upon the amount of the segments between ink points forming the object. For example, an ink object formed of n data points will have n−1 line segments connecting the data points (one segment between two points). If a lasso enclosure extends between two data points, it may encompass a large amount of the segment between the two data points without actually encompassing either data point. Accordingly, it may be desirable to select an ink object based upon the percentage of the cumulative length of its segments encompassed by the lasso enclosure. Thus, if the total length of segments between data points in an ink object is 34 units, and the lasso enclosure encompasses 21 units or more of those segments, then the ink object will be selected. Of course, alternate techniques for determining the overall size of an ink object may also be employed.

It should also be noted that different ink data points may have different properties affecting the pixels used to represent the ink line formed by the data points. For example, if the user creates ink data points by pressing a stylus against a digitizer, the amount of pixels representing each data point may be based upon the force at which the stylus was depressed against the digitizer when creating that point. Thus, it may alternately be desirable to select an ink object based upon the total number of pixels displaying that object. For example, if a handwritten letter "H" is displayed with 30 pixels, the entire letter may be selected if 60% or more (that is, more than 18 pixels) are encompassed by the lasso enclosure. Of course, some embodiments of the lasso select tool 401 may alternately provide ink objects with boundary boxes, and then determine the selection of ink objects based upon the amount of area within each boundary box encompassed by the lasso enclosure.

With image objects, the lasso select tool 401 may determine whether an image object is selected based upon the number of pixels in the image. As previously noted, some embodiments of the lasso select tool 401 may not select an image unless 80% or more of that image is encompassed by the lasso enclosure. In order to simplify this determination, however, the lasso select tool 401 may divide an image object into a more granular grid before determining how much of the image object is encompassed by the lasso enclosure. For example, if an image has a size of 800×1000 pixels, the lasso select module 409 may divide the image into a grid of 80 units×100 units, and then determine whether the lasso enclosure encompasses 80% or more of these units. This granulation reduces the calculations necessary to determine if an image object has been selected by a lasso enclosure.

Like an image object, the lasso select module 409 may select a text box if 80% or more of the text box is encompassed by the lasso enclosure. Further, the determination of whether a text box is selected may be based upon the amount of the area defined by the box that is encompassed by the lasso enclosure. This criterion avoids a situation where, for example, a text box may not be selected if a user draws a lasso enclosure within the text box without actually contacting the boundaries of the box. As with an image object, various embodiments of the lasso tool 401 may divide the area of a text box into a more granular grid to simplify the selection determination. For example, if the text box defines an area of 400×600 pixels, the lasso select module 409 may divide the area defined by the text box into a grid of 4×6 units, and then determine whether the lasso enclosure encompasses 80% or more of these units.

With some embodiments of the lasso select tool 401, the user interface module 403 may change the appearance of text boxes available for selection when the tool 401 is activated. Changing the appearance of the text boxes can assist a user in determining how much of the text box exists and therefore must be encompassed by the lasso enclosure for selection. For example, the user interface module 403 may display an outline of the text box, or provide a faint highlight to the area within the text box. Of course, some embodiments of the lasso select tool 401 may alternately allow a user to select individual text objects within a text box. Further, the lasso select tool 401 may provide a "best-fit" text box feature that automatically shrinks the size of a text box to closely bound its contained text, in order to make the selection of the text box more convenient.

It should be noted that the techniques described above for determining if a graphical object is encompassed by a lasso enclosure are exemplary, and are not intended to be limiting. Those of ordinary skill in the art will appreciate that a wide variety of alternate techniques can be used to determine if different types of objects are substantially encompassed by a lasso enclosure. For example, ASCII text may be selected based upon native points in the text, a normalized size of the text, or upon the pixel screen area covered by the text. Still further, as noted above, the amount of an object that must be encompassed by the lasso enclosure before that object is selected can vary as desired.

Returning now to FIG. 5C, once the lasso select module 409 has selected the objects that are substantially encompassed by the lasso enclosure, it identifies those selected objects to the user interface module 403. Then, in step 519, the user interface module 403 changes the appearance of the selected objects, so that the user can identify which objects have been selected before the selection process is completed. In step 521, the user interface module 403 determines if the user has created any new selection ink points for collection. If there are newly created selection ink points (that is, if the user is still in the process of drawing the selection line), then steps 503 to 521 are repeated to process the new selection ink points. If the user has not created new selection ink, then the selection operation ends in step 523. For example, if the user has drawn the lasso enclosure with a stylus on a digitizing display, the user can end the selection operation by lifting the stylus from the digitizing display in step 523.

As will be appreciated by those of ordinary skill in the art, there may be instances where a user draws the selection line such that one portion of the selection line crosses over another portion of the selection line. Various embodiments of the invention may treat these intersections in any number of different ways as desired. For example, the lasso select tool 401 may treat the most recently created intersection point as the starting point of the selection line, and thus draw the connection line from this intersection point to the end point of the selection line to form the lasso enclosure. Alternately, the area enclosed by the intersection may be treated as the lasso enclosure. Still further, an intersection may automatically delete the selection line in its entirety, or just the portion drawn before the intersection. Various other techniques for treating a self-intersection of the selection line will be apparent to those of ordinary skill in the art, and thus will not be discussed here in detail.

CONCLUSION

As will be apparent from the foregoing description, the lasso select tool of the invention provides a flexible and convenient tool for selecting graphical objects. More particularly, the tool allows a user to select a graphical object simply by enclosing a substantial portion of the object, without have to worry about enclosing the entirety of the object, the designated center of the object, or avoiding contact with any adjacent objects. Moreover, the tool provides an immediate indication when an object has been selected, without waiting until the selection process is completed. Thus, the lasso select tool of the invention provides a convenient selection tool for both irregularly shaped objects, such as ink objects. Further, the tool conveniently allows for the selection of irregularly positioned objects, such as objects that are not arranged in a straight line.

Although the invention has been defined using the appended claims, these claims are exemplary in that the invention may include the elements and steps described herein in any combination or sub combination. For example, various embodiments of the invention may employ another type of selection enclosure, such as a rubber band rectangular enclosure, rather than a lasso enclosure, that selects an object substantially enclosed by the selection enclosure. Alternately, various embodiments of the invention may require the lasso enclosure to encompass an entire object or designated center of an object in order to select that object. With these embodiments, however, the tool will display the connection line forming the enclosure and immediately change the appearance of selected objects, in order to indicate to the user which objects have been selected before the selection process is complete. With still other embodiments of the invention, the tool may select objects that are substantially encompassed by the lasso enclosure, but may omit continuously redrawing the connection line.

Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. One or more computer storage media storing computer-executable instructions for performing a method of selecting a graphical object, the method comprising:

receiving user input defining a selection line having a starting point and an end point, wherein the end point is redrawn as additional segments of the selection line are defined through user input;

when the selection line is substantially straight, selecting each object intersected by the selection line; and when the selection line is non-linear, drawing a connection line joining the starting point and the end point of the selection line to thereby form a lasso enclosure while additional segments of the selection line are still being defined by user input, wherein the connection line is deleted and redrawn as the end point is redrawn, and selecting each object substantially encircled by the lasso enclosure when the percentage of each respective object encircled by the lasso enclosure meets or exceeds a predetermined threshold, wherein the predetermined threshold associated with a graphical object formed of electronic ink is less than the predetermined threshold associated with an image object.

2. The media of claim 1, further comprising:

selecting only objects that are 80% or more encircled by the lasso enclosure.

3. The media of claim 1, further comprising:

selecting only objects that are 60% or more encircled by the lasso enclosure.

4. The media of claim 1, further comprising:

selecting only image objects that are 80% or more encircled by the lasso enclosure;

selecting only electronic ink objects that are 60% or more encircled by the lasso enclosure; and selecting only text box objects that are 80% or more encircled by the lasso enclosure.

5. The media of claim 1, further comprising:

changing the appearance of each selected object.

6. The media of claim 1, wherein selecting each object substantially encircled by the lasso enclosure includes:

defining a boundary for the lasso enclosure; and for each object:

defining a boundary box for the object, determining whether the boundary box for the object intersects or is encircled by the boundary of the lasso enclosure, and when the object has a boundary box that intersects or is encircled by the boundary of the lasso enclosure, determining what portion of the object is encircled by the lasso enclosure.

7. The media of claim 6, wherein selecting each object substantially encircled by the lasso enclosure further includes:

defining a boundary box for the lasso enclosure; and using the boundary box defined for the lasso enclosure as the boundary of the lasso enclosure.

8. The media of claim 6, wherein selecting each object substantially encircled by the lasso enclosure further includes:

determining a perimeter of the lasso enclosure; and using the determined perimeter of the lasso enclosure as the boundary of the lasso enclosure.

* * * * *